(12) United States Patent
Takezoe et al.

(10) Patent No.: US 9,726,093 B2
(45) Date of Patent: Aug. 8, 2017

(54) APPARATUS FOR ESTIMATING EXHAUST GAS RECIRCULATION QUANTITY

(75) Inventors: Hiroyuki Takezoe, Kariya (JP); Hiroshi Katsurahara, Okazaki (JP); Chika Ozaki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 1173 days.

(21) Appl. No.: 13/480,641

(22) Filed: May 25, 2012

(65) Prior Publication Data

US 2012/0303346 A1 Nov. 29, 2012

(30) Foreign Application Priority Data

May 27, 2011 (JP) .................................. 2011-119729
Apr. 2, 2012 (JP) .................................. 2012-083572

(51) Int. Cl.
*G06G 7/48* (2006.01)
*F02D 41/00* (2006.01)
(Continued)

(52) U.S. Cl.
CPC .... *F02D 41/0072* (2013.01); *F02D 2021/083* (2013.01); *F02D 2041/1431* (2013.01);
(Continued)

(58) Field of Classification Search
None
See application file for complete search history.

(56) References Cited

U.S. PATENT DOCUMENTS 6,959,254 B2 * 10/2005 Reuschenbach et al. .... 702/100
2004/0122584 A1 * 6/2004 Muto et al. ................... 701/108
(Continued)

FOREIGN PATENT DOCUMENTS

JP 8-61112 3/1996
JP 2004-116459 4/2004
(Continued)

OTHER PUBLICATIONS

Grondin, Oliver, et al., "Control of a Turbocharged Diesel Engine Fitted with High Pressure and Low Pressure Exhaust Gas Recirculation Systems," Joint 48th IEEE Conference on Decision and Control and 28th Chinese Control Conference, Shanghai, P.R. China, Dec. 16-18, 2009, pp. 6582-6589.*

(Continued)

*Primary Examiner* — Aniss Chad
*Assistant Examiner* — David M Rogers
(74) *Attorney, Agent, or Firm* — Nixon & Vanderhye P.C.

(57) ABSTRACT

In an EGR system, a quantity of exhaust gas passing through an EGR valve is computed by an EGR valve model simulating a behavior of the recirculated exhaust gas passing through the EGR valve. An exhaust gas quantity flowing into a cylinder is computed by an EGR-gas-delay model simulating a behavior of the exhaust gas passing through the EGR valve and the throttle valve and then flows into a cylinder. The EGR-gas-delay model includes a confluent-delay model simulating a behavior of EGR gas passing thorough the EGR valve and flowing into the intake passage upstream of the throttle valve; an intake-pipe-delay model simulating a behavior of EGR gas flowing in the intake passage and passing through the throttle valve; and an intake-manifold-delay model simulating a behavior of EGR gas which passes through the throttle valve and then flows into the intake passage downstream of the throttle valve.

6 Claims, 8 Drawing Sheets

(51) Int. Cl.
  *F02D 21/08* (2006.01)
  *F02D 41/14* (2006.01)
  *F02M 26/06* (2016.01)
  *F02M 26/35* (2016.01)

(52) U.S. Cl.
  CPC ..... *F02D 2200/0402* (2013.01); *F02M 26/06* (2016.02); *F02M 26/35* (2016.02); *Y02T 10/47* (2013.01)

(56) References Cited

U.S. PATENT DOCUMENTS

| | | | |
|---|---|---|---|
| 2005/0217256 A1* | 10/2005 | Okugawa et al. | 60/295 |
| 2006/0235603 A1* | 10/2006 | Kobayashi et al. | 701/108 |
| 2007/0012040 A1* | 1/2007 | Nitzke et al. | 60/605.2 |
| 2008/0022677 A1* | 1/2008 | Barbe et al. | 60/599 |
| 2009/0063023 A1* | 3/2009 | Nagae | 701/108 |
| 2009/0132153 A1* | 5/2009 | Shutty et al. | 701/108 |
| 2011/0120428 A1* | 5/2011 | Pasero et al. | 123/564 |

FOREIGN PATENT DOCUMENTS

| | | |
|---|---|---|
| JP | 2004-211590 | 7/2004 |
| JP | 2008-101626 | 5/2008 |
| JP | 2010-203281 | 9/2010 |

OTHER PUBLICATIONS

U.S. Appl. No. 13/480,583 of Minami et al, filed May 25, 2012.
U.S. Appl. No. 13/481,231 of Nogami et al, filed May 25, 2012.
U.S. Appl. No. 13/481,192 of Minami et al, filed May 25, 2012.
Office Action (6 pages) dated Sep. 3, 2014, issued in corresponding Chinese Application No. 201210167009.2 and English translation (7 pages).
Office Action (2 pages) dated Jul. 22, 2015, issued in corresponding Japanese Application No. 2012-083572 and English translation (2 pages).

* cited by examiner

EGR-VALVE MODEL $$\text{Megr} = C \cdot A \cdot \frac{\text{Pin}}{\sqrt{R \cdot \text{Tegr}}} \cdot \Phi(\text{Pout}/\text{Pin})$$

APPARATUS FOR ESTIMATING EXHAUST GAS RECIRCULATION QUANTITY

CROSS-REFERENCE TO RELATED APPLICATIONS

This application is based on Japanese Patent Applications No. 2011-119729 filed on May 27, 2011 and No. 2012-83572 filed on Apr. 2, 2012, the disclosures of which are incorporated herein by reference.

TECHNICAL FIELD

The present disclosure relates to an apparatus for estimating exhaust gas recirculation quantity (EGR-quantity) which flows into a cylinder of an internal combustion engine.

BACKGROUND

JP-2008-101626A shows an internal combustion engine provided with an exhaust gas recirculation (EGR) system. In the EGR system, a part of exhaust gas emitted from the engine is recirculated into an intake passage downstream of a throttle valve through an EGR passage. The quantity of the recirculated exhaust gas is controlled by an EGR valve. In this EGR system, the quantity of exhaust gas (EGR-quantity) passing through the EGR valve is computed by means of an EGR valve model which simulates a behavior of the recirculated exhaust gas passing through the EGR valve. When the engine is stably running, it is deemed that the quantity of the exhaust gas passing through the EGR valve is equal to the quantity of the exhaust gas flowing into a cylinder. When the engine is in a transitional running condition, the quantity of exhaust gas (EGR-quantity) flowing into the cylinder is computed based on the quantity of the exhaust gas passing through the EGR valve by means of a EGR diffusion model (time delay+first order lag) which simulates a behavior of the exhaust gas flowing in an intake pipe toward an intake port of the engine.

In order to improve fuel economy of the engine equipped with an EGR system, it is necessary to control the quantity of the recirculated exhaust gas flowing into a cylinder so that gas including exhaust gas is efficiently combusted in a cylinder. Thus, it is necessary to estimate the quantity recirculated exhaust gas flowing into the cylinder with high accuracy.

The EGR system includes two types of system. In one system, the EGR gas is recirculated into an intake passage downstream of the throttle valve. In the other system, the EGR gas is recirculated into an intake passage upstream of the throttle valve. In this system where the EGR gas is recirculated into an intake passage upstream of the throttle valve, since an inner volume of the intake passage is relatively large, a variation in EGR-quantity is slow relative to a variation in the EGR valve opening.

Even if an estimation method of the EGR-quantity shown in JP-2008-101626A is applied to the system where the EGR gas is recirculated into an intake passage upstream of the throttle valve, it is difficult to accurately estimate the EGR-quantity.

SUMMARY

It is an object of the present disclosure to provide an apparatus which is able to accurately estimate exhaust gas recirculation quantity flowing into a cylinder of an internal combustion engine in a system where exhaust gas is recirculated into an intake passage upstream of the throttle valve.

According to the present disclosure, an apparatus for estimating exhaust gas recirculation quantity of an internal combustion engine provided with an EGR valve which adjusts a quantity of an exhaust gas recirculating from an exhaust passage to an intake passage upstream of a throttle valve through an EGR passage.

The apparatus includes: a computing portion which computes a quantity of the exhaust gas passing through the EGR valve by means of an EGR, valve model which simulates a behavior of a recirculated exhaust gas passing through the EGR valve in the EGR passage. The computing portion further computes a quantity of the exhaust gas flowing into a cylinder based on the quantity of the exhaust gas passing through the EGR valve, by means of an EGR-gas-delay model which simulates a behavior of the exhaust gas passing through the EGR valve and the throttle valve and then flows into a cylinder.

In this system where the EGR gas is recirculated into an intake passage upstream of the throttle valve, a computing portion can compute a quantity of the exhaust gas flowing into a cylinder based on the quantity of the exhaust gas passing through the EGR valve, by means of an EGR-gas-delay model which simulates a behavior of the exhaust gas passing through the EGR valve and the throttle valve and then flows into a cylinder. Thereby, even if a variation in EGR gas quantity flowing into cylinder is slow relative to a variation in opening degree of the EGR valve, the quantity of exhaust gas flowing into a cylinder can be accurately estimated.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present invention, which are applied to an internal combustion engine equipped with a supercharger, will be described hereinafter.

[First Embodiment]

Referring to FIGS. 1 to 6, a first embodiment will be described hereinafter.

Figure 1:
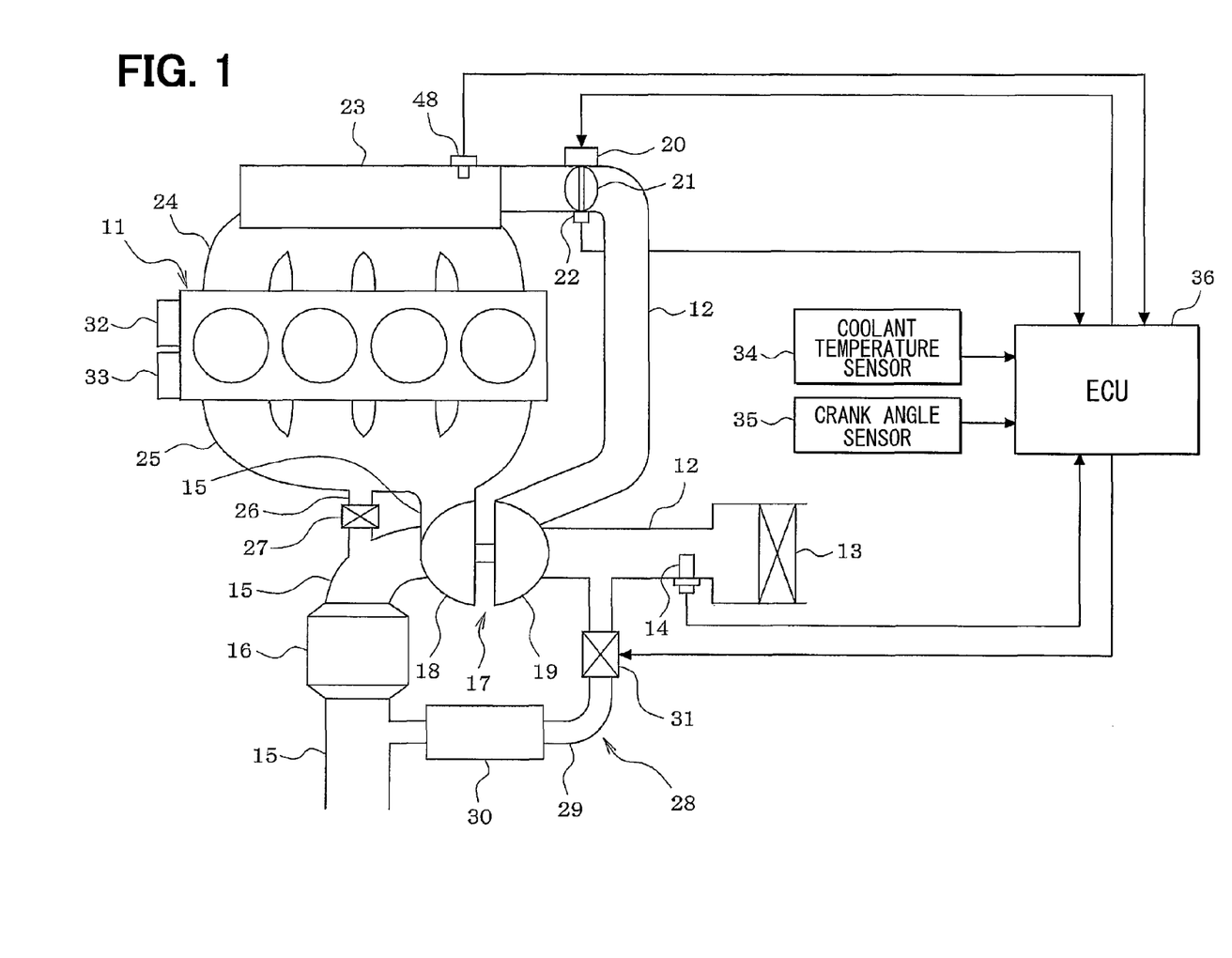
FIG. 1 is a schematic view of an engine control system with a supercharger according to a first embodiment of the present invention.

Referring to FIG. 1, an engine control system will be schematically explained. An air cleaner 13 is arranged upstream of an intake pipe 12 (intake passage) of an internal combustion engine 11. An airflow meter 14 (intake air flow rate obtaining portion) detecting an intake air flow rate is provided downstream of the air cleaner 13. An exhaust pipe 15 (exhaust passage) of the engine 11 is provided with a three-way catalyst 16 which reduces CO, HC, NOx, and the like contained in exhaust gas.

The engine 11 is provided with a turbocharger 17. The turbocharger 17 includes an exhaust gas turbine 18 arranged upstream of the catalyst 16 in the exhaust pipe 15 and a compressor 19 arranged downstream of the airflow meter 14 in the intake pipe 12. This turbocharger 17 has well known configuration which supercharges the intake air into the combustion chamber.

A throttle valve 21 driven by a DC-motor 20 and a throttle position sensor 22 detecting a throttle position (throttle opening degree) are provided downstream of the compressor 19.

Furthermore, an intake vacuum sensor 48 detecting an intake pipe pressure is provided downstream of the throttle valve 21. An intercooler (not shown) is provided in a surge tank 23. The intercooler may be arranged upstream of the surge tank 23 and the throttle valve 21. An intake manifold 24 (intake passage) which introduces air into each cylinder of the engine 11 is provided downstream of the surge tank 23, and a fuel injector (not shown) which injects fuel is provided for each cylinder. A spark plug (not shown) is mounted on a cylinder head of the engine 11 corresponding to each cylinder to ignite air-fuel mixture in each cylinder.

An exhaust manifold 25 (exhaust passage) is connected to each exhaust port of the cylinder. A confluent portion of the exhaust manifold 25 is connected to the exhaust pipe 15 upstream of the exhaust gas turbine 18. An exhaust bypass passage 26 bypassing the exhaust gas turbine 18 is connected to the exhaust pipe 15. A waste gate valve (WGV) 27 is disposed in the exhaust bypass passage 26 to open/close the exhaust bypass passage 26.

The engine 11 is provided with an exhaust gas recirculation (EGR) apparatus 28 for recirculating a part of exhaust gas from the exhaust pipe 15 into the intake pipe 12. This EGR apparatus 28 is referred to as low-pressure-loop (LPL) type. The EGR apparatus 28 has an EGR pipe 29 connecting the exhaust pipe 15 upstream of the catalyst 16 and the intake pipe 12 upstream of the compressor 19 and the throttle valve 21. An EGR cooler 30 for cooling EGR gas and an EGR valve 31 for adjusting an exhaust gas recirculation quantity (EGR-quantity) are provided in the EGR pipe 29. An opening degree of the EGR valve 31 is adjusted by a motor (not shown). When the EGR valve 31 opens the EGR pipe 29, a part of exhaust gas (EGR gas) is recirculated from the exhaust pipe 15 to the intake pipe 12 through the EGR pipe 29.

The engine 11 is provided an intake-side variable valve timing controller 32 which adjusts a valve timing of an intake valve (not shown), and an exhaust-side variable valve timing controller 33 which adjusts a valve timing of an exhaust valve (not shown). Further, the engine 11 is provided with a coolant temperature sensor 34 detecting coolant temperature and a crank angle sensor 35 outputting a pulse signal every when the crank shaft (not shown) rotates a specified crank angle. Based on the output signal of the crank angle sensor 35, a crank angle and an engine speed are detected.

The outputs of the above sensors are transmitted to an electronic control unit (ECU) 36. The ECU 36 includes a microcomputer which executes an engine control program stored in a Read Only Memory (ROM) to control a fuel injection quantity, an ignition timing, a throttle position (intake air flow rate) and the like.

When an air-fuel-ratio feedback control execution condition is established during an engine operation, the ECU 30 computes an air-fuel-ratio feedback correction value based on an output of the exhaust gas sensor (air-fuel ratio sensor or oxygen sensor: not shown) so that an air-fuel ratio in the exhaust gas agrees with a target air-fuel-ratio (for example, stoichiometric ratio). The air-fuel-ratio feedback control is performed by use of the air-fuel-ratio feedback correction value in order to correct the fuel injection quantity of the fuel injector 21.

When an engine driving region corresponds to an EGR execution region, the EGR valve 31 opened to recirculate a part of EGR gas into the intake pipe 12. At this time, the ECU 36 executes an EGR-quantity computing routine shown in FIG. 6 to compute an EGR-quantity flowing into cylinders. This EGR-quantity flowing into cylinders is denoted by "QEGR", hereinafter. The ECU 36 feedback-controls the opening degree of the EGR valve 31 in such a manner that the computed "QEGR" agrees with a target "QEGR". Alternatively, the ECU 36 computes an EGR ratio based on the computed "QEGR" and feedback-controls the opening degree of the EGR valve 31 in such a manner that the EGR ratio agrees with a target EGR ratio.

$$\text{EGR ratio}=QEGR/QTOTAL=QEGR/(QINTAKE+QEGR)$$

wherein "QINTAKE" represents an intake fresh air flow rate flowing into cylinders, and "QTOTAL" represents total flow rate of gas flowing into cylinders.

Alternatively, based on the computed "QEGR", an ignition timing, an intake valve timing and an exhaust valve timing can be controlled.

Figure 2:
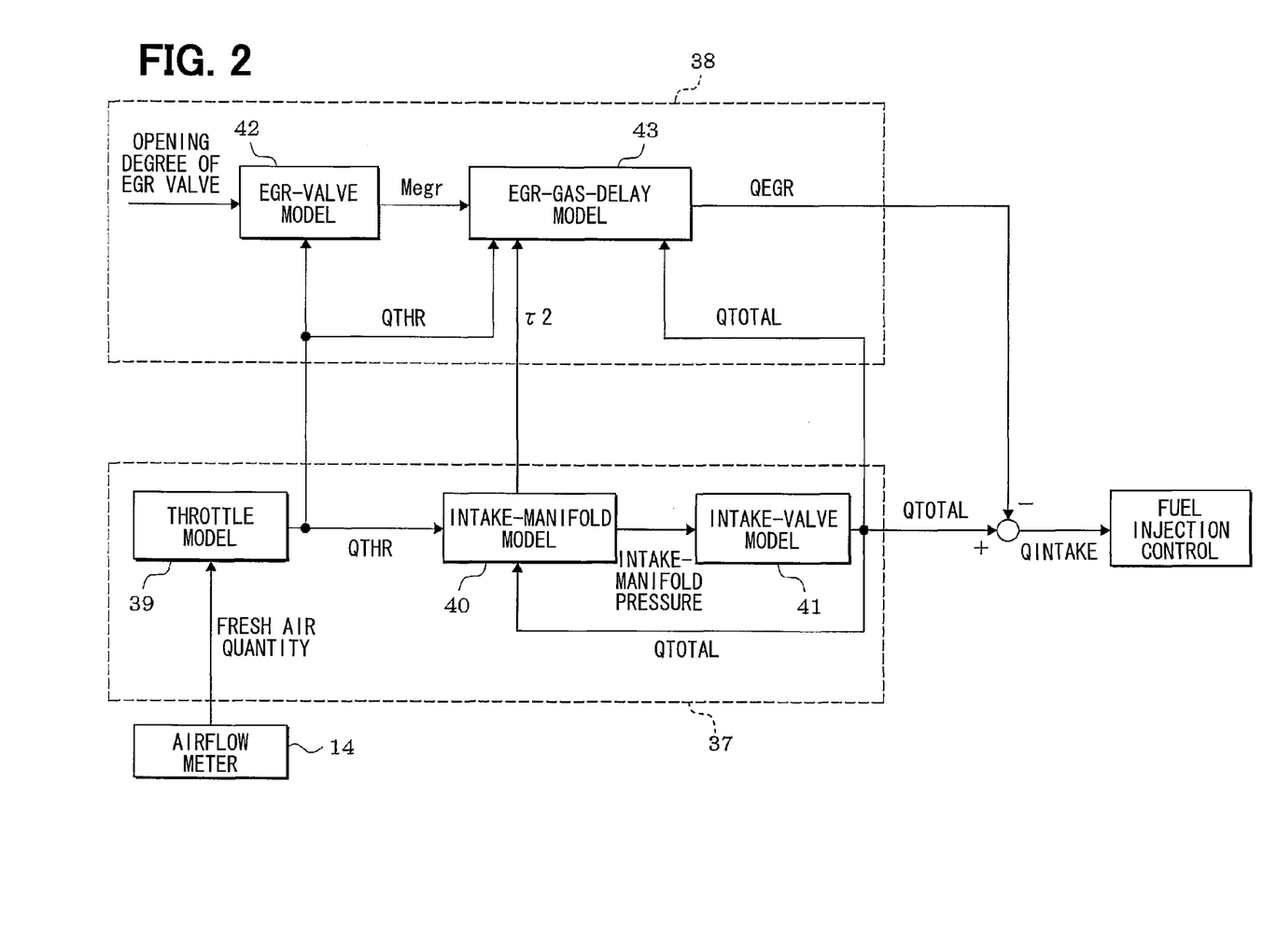
FIG. 2 is a block diagram for explaining a method for computing a total quantity of gas flowing into a cylinder and a quantity of exhaust gas flowing into a cylinder.

As shown in FIG. 2, a total-gas-quantity computing portion 37 computes "QTOTAL", an EGR-quantity computing portion 38 computes "QEGR". The "QINTAKE" is obtained by subtracting "QEGR" from "QTOTAL". A fuel injection control is conducted based on the "QINTAKE".

The total-gas-quantity computing portion 37 computes a total gas quantity flowing through the throttle valve 21 by using of a throttle model 39 which simulates a behavior of gas passing through the throttle valve 21. Total gas quantity flowing through the throttle valve 21 is denoted by "QTHR". As the throttle model 39, a throttle model shown in JP-2008-101626A may be used.

In the present embodiment, the computed "QTHR" is corrected by a detection value of the airflow meter 14. Specifically, when a specified correction-value-learning condition is established, a difference between the detection value of the airflow meter 14 and the computed "QTHR" is stored in a memory as a gas-quantity-correction coefficient "Cgas". The computed "QTHR" is corrected by using of "Cgas", whereby "QTHR" can be obtained with high accuracy.

An intake-manifold model 40 simulates a behavior of gas which passes through the throttle valve 21 and flows into the surge tank 23 and the intake manifold 24. The intake-manifold model 40 computes an intake manifold pressure (pressure in intake passage downstream of the throttle valve 21) based on previous values of "QTHR" and "QTOTAL". As the intake-manifold model 40, an intake-pipe model shown in JP-2008-101626A may be used.

An intake-valve model 41 simulates a behavior of gas flowing into a cylinder. The intake-valve model 41 computes the "QTOTAL" based on the intake manifold pressure. As the intake-valve model 41, an intake-valve model shown in JP-2008-101626A may be used.

The EGR-quantity computing portion 38 computes a quantity of the exhaust gas passing through the EGR valve 31 by means of an EGR-valve model 42 which simulates a behavior of the recirculated exhaust gas passing through the EGR valve 31 in the EGR pipe 29. The quantity of the exhaust gas passing through the EGR valve 31 is denoted by "Megr".

Figure 3:
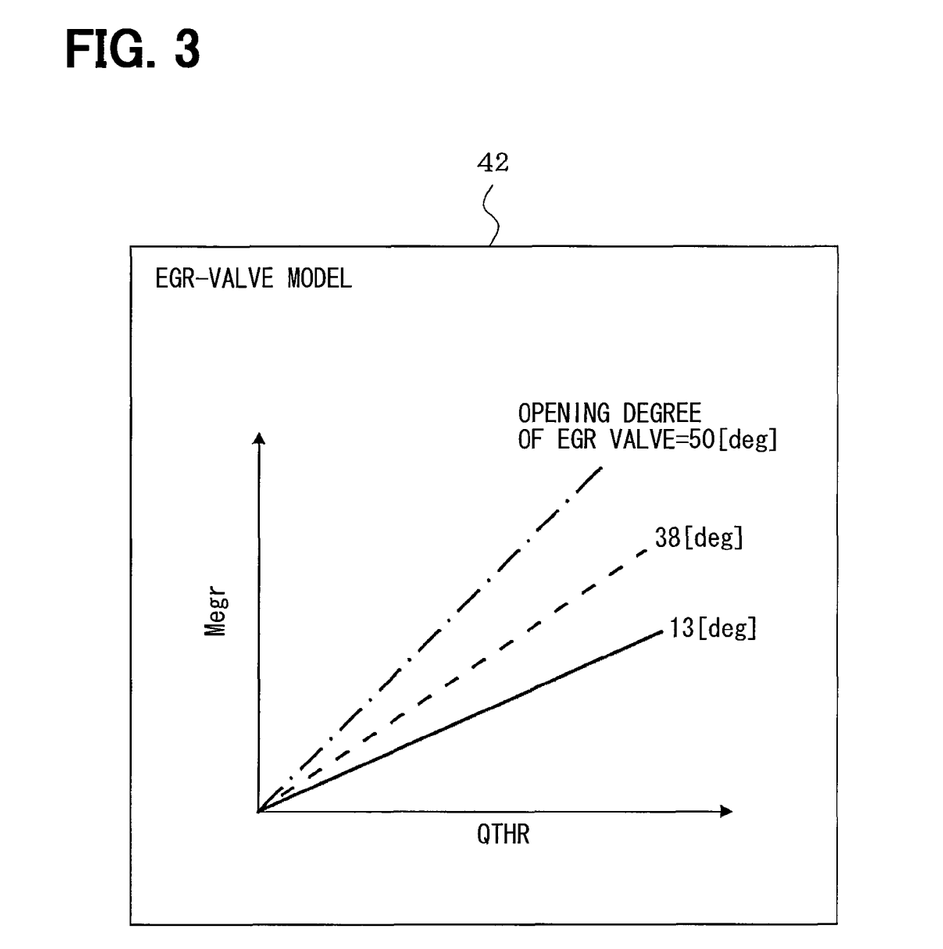
FIG. 3 is a chart for explaining an EGR valve model according to the first embodiment.

As shown in FIG. 3, the EGR-valve model 42 is configured by a map which defines a relationship between an opening degree of the EGR valve 31, "QTHR" and "Megr". This map is previously formed based on experimental data and design data, and is stored in the ROM of the ECU 36.

An EGR-gas-delay model 43 (FIG. 2) computes "QEGR" based on a computed "Megr". The EGR-gas-delay model 43 simulates a behavior of the exhaust gas passing through the EGR valve 31 and the throttle valve 21 and flows into a cylinder.

Figure 4:
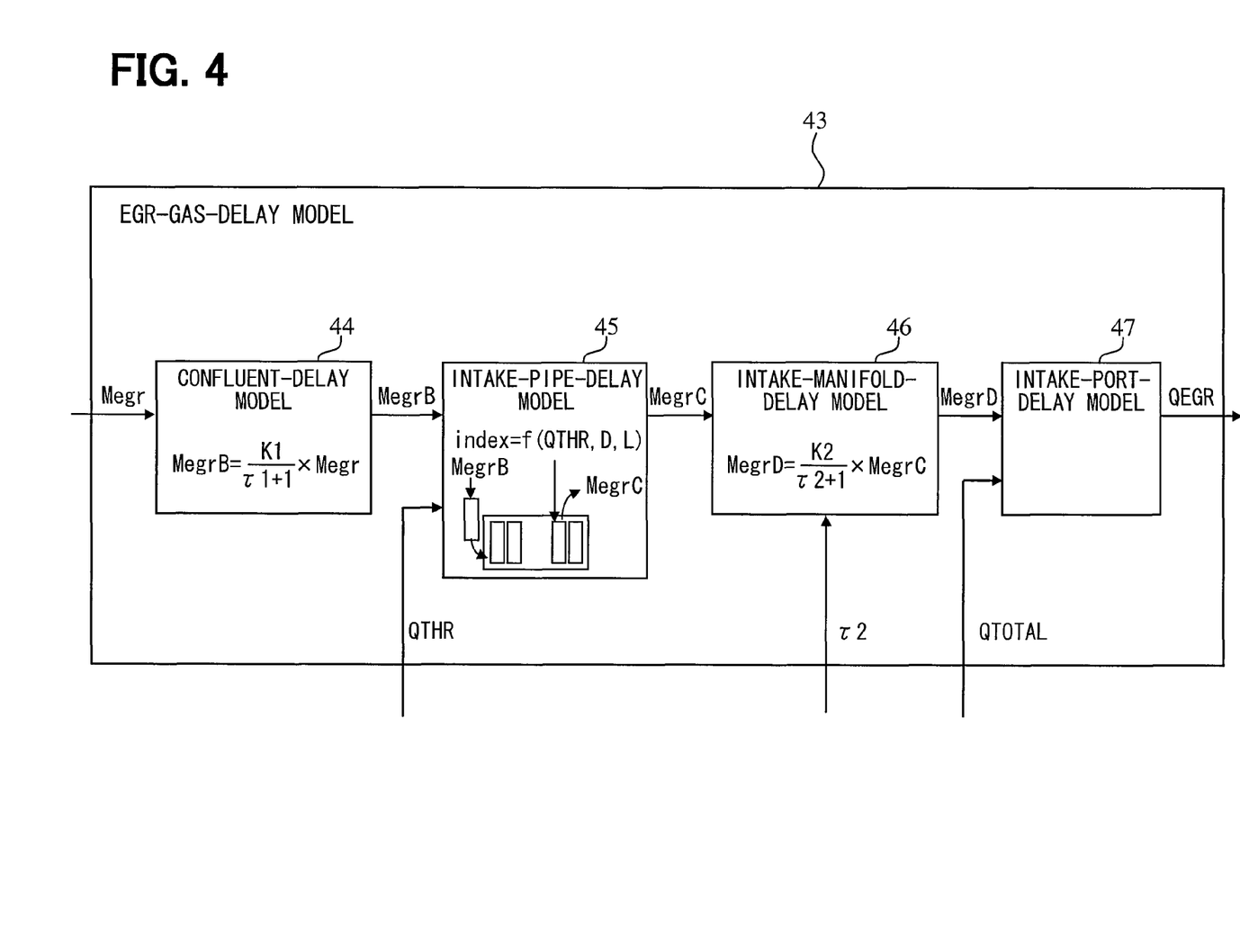
FIG. 4 is a block diagram for explaining an EGR-gas-delay model.

As shown in FIG. 4, the EGR-gas-delay model 43 includes four models 44, 45, 46 and 47 as follows: That is, a confluent-delay model 44 simulates a behavior of EGR gas passing thorough the EGR valve 31 and flowing into the intake passage upstream of the throttle valve 21. An intake-pipe-delay model 45 simulates a behavior of EGR gas flowing in the intake passage and passing through the throttle valve 21. An intake-manifold-delay model 46 simulates a behavior of EGR gas which passes through the throttle valve 21 and flows into the surge tank 23 and the intake manifold 24. An intake-port-delay model 47 simulates a behavior of EGR gas flowing into the cylinder through an intake port.

According to the above EGR-gas-delay model 43, a delay of EGR gas flowing into the intake passage upstream of the throttle valve 21, a flow delay of EGR gas passing through the throttle valve 21, a charge delay of EGR gas flowing into the intake passage downstream of the throttle valve 21, and a flow delay of EGR gas flowing into a cylinder through the intake port are computed. The "QEGR" can be computed based on the above delays, whereby the "QEGR" can be computed with high accuracy.

When computing "QEGR", the confluent-delay model 44 computes an EGR-gas quantity "MegrB" flowing into the intake passage upstream of the throttle valve 21 based on the "Megr" passing through the EGR valve 31.

The confluent-delay model 44 can be approximated by following formula (1):

$$MegrB=\{K1/(\tau1+1)\}\times Megr \quad (1)$$

wherein "K1" is a coefficient and "τ1" is a time constant, which are previously obtained by experiments. "K1" and "τ1" depend on a length and inner diameter of the EGR pipe 29 and an inner diameter of the intake pipe 12.

Then, the intake-pipe-delay model 45 computes an EGR gas quantity "MegrC" passing through the throttle valve 21 based on the "MegrB" and "QTHR".

Figure 5:
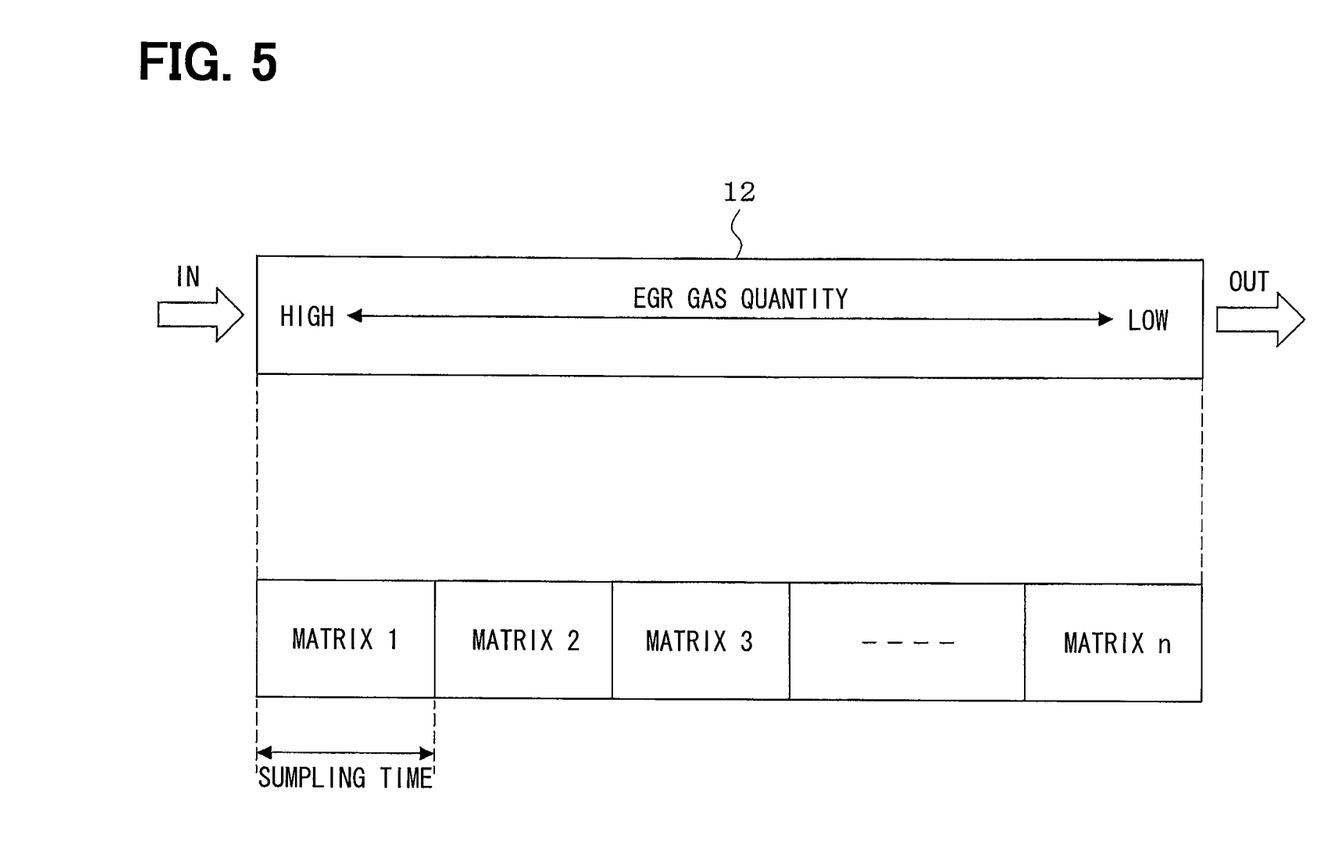
FIG. 5 is a chart for explaining an intake-pipe-delay model.

As shown in FIG. 5, the intake-pipe-delay model 45 is formed of matrix which discretizes, by arbitrary time, a behavior of EGR gas flowing into the intake passage upstream of the throttle valve 21 and passing through the throttle valve 21. For example, the model 45 is formed of 32 matrix discretized every 18 μsec. Generally, since a flow velocity of EGR gas in the intake pipe 12 is slower than a computation speed of the ECU 36, the intake-pipe-delay model 45 can be formed of matrix which discretized by arbitrary time. Various coefficients used in the intake-pipe-delay model 45 are previously obtained by experiments. These coefficients depend on the length and inner diameter of the intake pipe 12.

The intake-manifold-delay model 46, as shown in FIG. 4, computes an EGR gas quantity "MegrD" which is charged into the intake passage downstream of the throttle valve 21 based on the "MegrC".

The intake-manifold-delay model 46 is approximated by following formula (2):

$$MegrD=\{K2/(\tau2+1)\}\times MegrC \quad (2)$$

wherein "K2" is a coefficient and "τ2" is a time constant, which are previously obtained by experiments. "K2" and "τ2" depend on a length, an inner diameter and volume of the intake passage downstream of the throttle valve 21.

Then, the intake-port-delay model 47 computes an EGR gas quantity "QEGR" which flows into the cylinder based on the previous values of "MegrD" and "QTOTAL".

The intake-port-delay model 47 is formed of matrix which discretizes, by arbitrary time, a behavior of EGR gas flowing into the intake passage downstream of the throttle valve 21 and flowing into cylinder through the intake port. Various coefficients used in the intake-port-delay model 47 are previously obtained by experiments. These coefficients depend on the length and inner diameter of the intake port.

Figure 6:
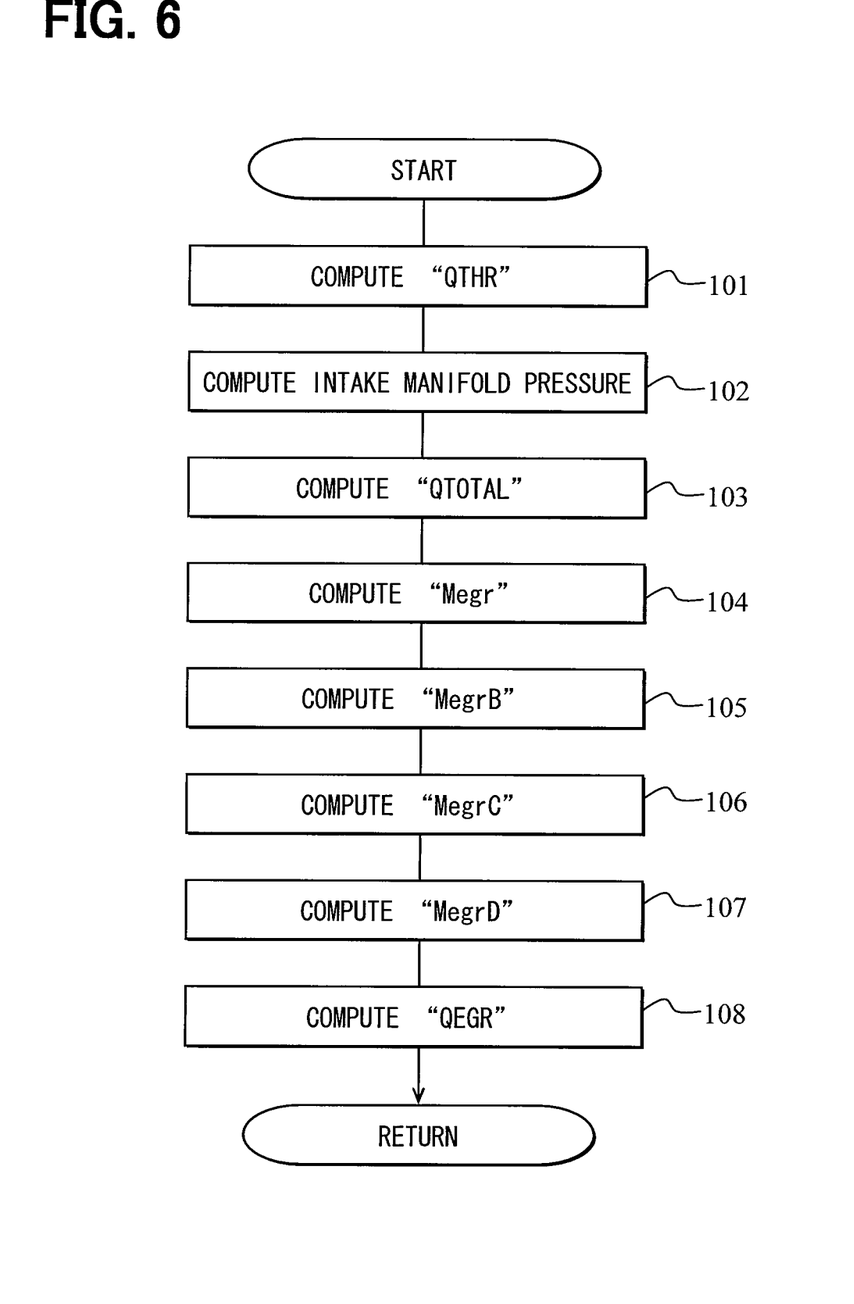
FIG. 6 is a flowchart showing a processing for computing a quantity of recirculated exhaust gas flowing into a cylinder.

The ECU 36 executes an EGR quantity computing routine shown in FIG. 6, whereby the functions of the total-gas-quantity-computing portion 37 and the EGR-quantity computing portion 38 are realized. The routine shown in FIG. 6 is executed at specified time intervals while the engine is running. In step 101, the throttle model 39 computes "QTHR". Then, the computed "QTHR" is corrected by a detection value of the airflow meter 14. In step 102, the intake-manifold model 40 computes an intake manifold pressure based on previous values of "QTHR" and "QTOTAL". Then, in step 103, the intake-valve model 41 computes "QTOTAL" based on the intake manifold pressure.

Then, in step 104, the EGR-valve model 31 computes "Megr" according to the opening degree of the EGR valve 31 and the "QTHR".

Then, in step 105, the confluent-delay model 44 computes "MegrB" based on "Megr". Then, in step 106, the intake-pipe-delay model 45 computes "MegrC" based on the "MegrB" and "QTHR".

In step 107, the intake-manifold-delay model 46 computes "MegrD" based on the "MegrC". Then, in step 108, the intake-port-delay model 47 computes "QEGR" based on the previous values of "MegrD" and "QTOTAL".

In the present embodiment, as described above, the EGR apparatus 28 referred to as low-pressure-loop (LPL) type EGR apparatus 28 is employed. In this EGR system, based on the EGR valve model 42 simulating the behavior of the EGR gas flowing through the EGR pipe 29, "Megr" is computed. Then, the EGR-gas-delay model 43 computes "QEGR" based on the computed "Megr".

The EGR-gas-delay model 43 includes: the confluent-delay model 44 which simulates a behavior of EGR gas passing thorough the EGR valve 31 and flowing into the intake passage upstream of the throttle valve 21; the intake-pipe-delay model 45 which simulates a behavior of EGR gas flowing in the intake passage and passing through the throttle valve 21; the intake-manifold-delay model 46 which simulates a behavior of EGR gas which passes through the throttle valve 21 and flows into the surge tank 23 and intake manifold 24; and the intake-port-delay model 47 which simulates a behavior of EGR gas flowing into the cylinder through an intake port.

Thereby, even if a variation in EGR gas quantity flowing into cylinder is slow relative to a variation in opening degree of the EGR valve 31, "QEGR" can be accurately estimated.

Furthermore, according to the first embodiment, the intake-pipe-delay model 45 is defined by matrix. Thus, while reducing a memory usage of the ECU 36, an estimation accuracy of the EGR gas quantity can be improved. Also, in view of the matrix, the EGR gas quantity of before the EGR gas flows into the cylinder can be estimated.

[Second Embodiment]

Figure 7:
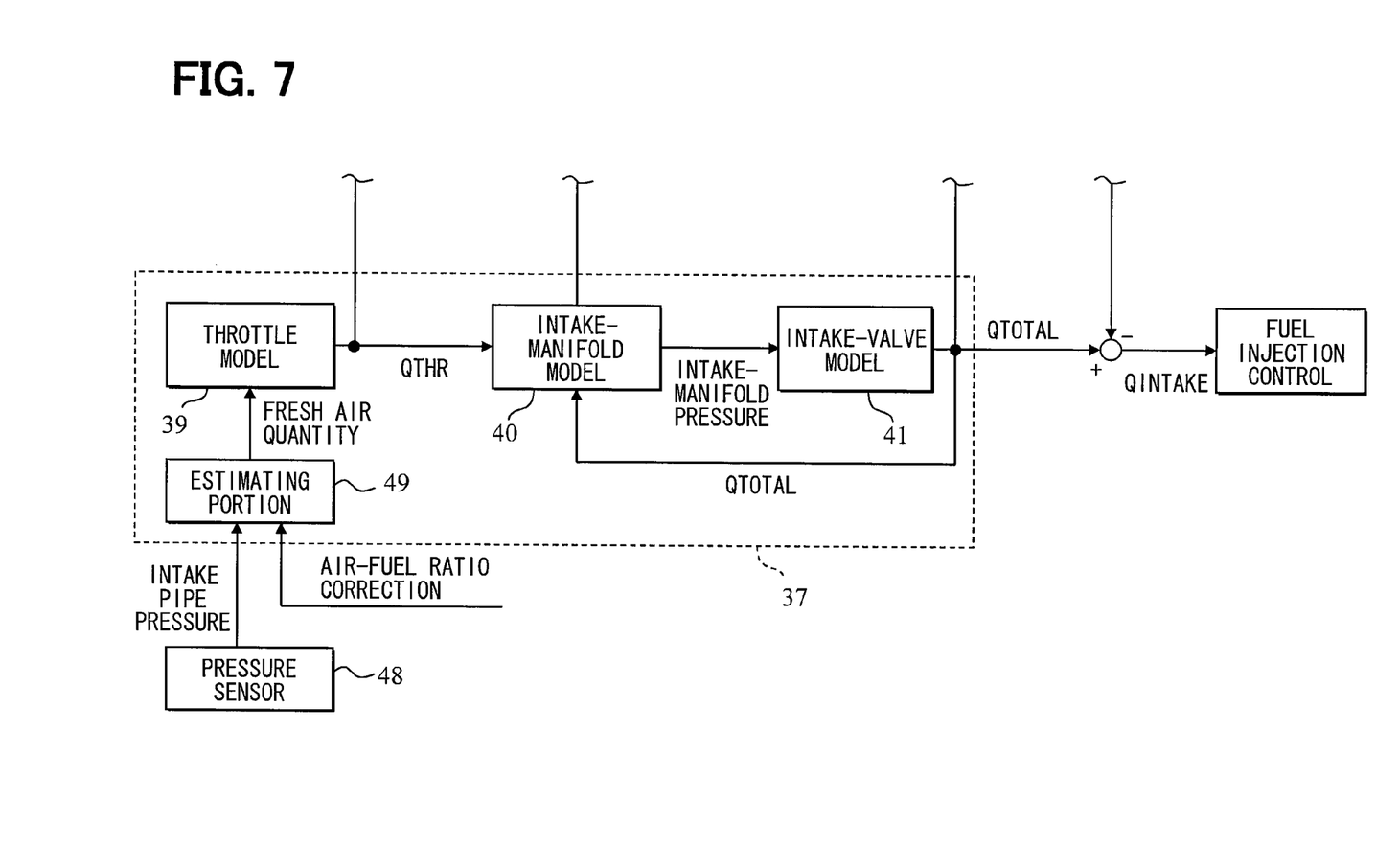
FIG. 7 is a block diagram for explaining a method for correcting a quantity of recirculated exhaust gas passed through a throttle valve, according to a second embodiment.

Referring to FIG. 7, a second embodiment will be described hereinafter. In the second embodiment, the same parts and components as those in the first embodiment are indicated with the same reference numerals and the same descriptions will not be reiterated.

In a system of the second embodiment, an airflow meter 14 is not provided. As shown in FIG. 7, the total-gas-quantity computing portion 37 is provided with a fresh-air-quantity estimating portion 49 which estimates a fresh air quantity based on a detection value of the intake pipe pressure sensor 48. Based on the estimated fresh air quantity, the computed "QTHR" is corrected.

Specifically, when a specified correction-value-learning condition is established, the fresh-air-quantity estimating portion 49 computes a fresh-air quantity based on the intake pipe pressure detected by the intake pipe pressure sensor 48. Further, the estimating portion 49 computes a correction value of the fresh-air quantity based on an air-fuel ratio correction value. Based on the correction value of the fresh-air quantity, the estimating portion 49 corrects the fresh-air quantity estimated based on the intake pipe pressure.

Due to an individual difference of the system and an aging deterioration, a relationship between an intake pipe pressure and the fresh-air quantity may vary. It is likely that error difference of the fresh-air quantity estimated from the intake pipe pressure may be increased. According to the present embodiment, the fresh-air quantity is corrected by using of a correction value which is obtained from the air-fuel ratio feedback quantity on which the individual difference and the aging deterioration are reflected. Thus, the fresh-air quantity can be obtained with high accuracy.

Then, a difference between the estimated fresh-air quantity and the computed "QTHR" is stored as the gas quantity correction value "Cgas". The computed "QTHR" is corrected by using of "Cgas". Thereby, even in a system provided with no airflow meter, the "QTHR" can be obtained with high accuracy.

According to the second embodiment, substantially the same advantage can be achieved as the first embodiment.

[Third Embodiment]

Figure 8:
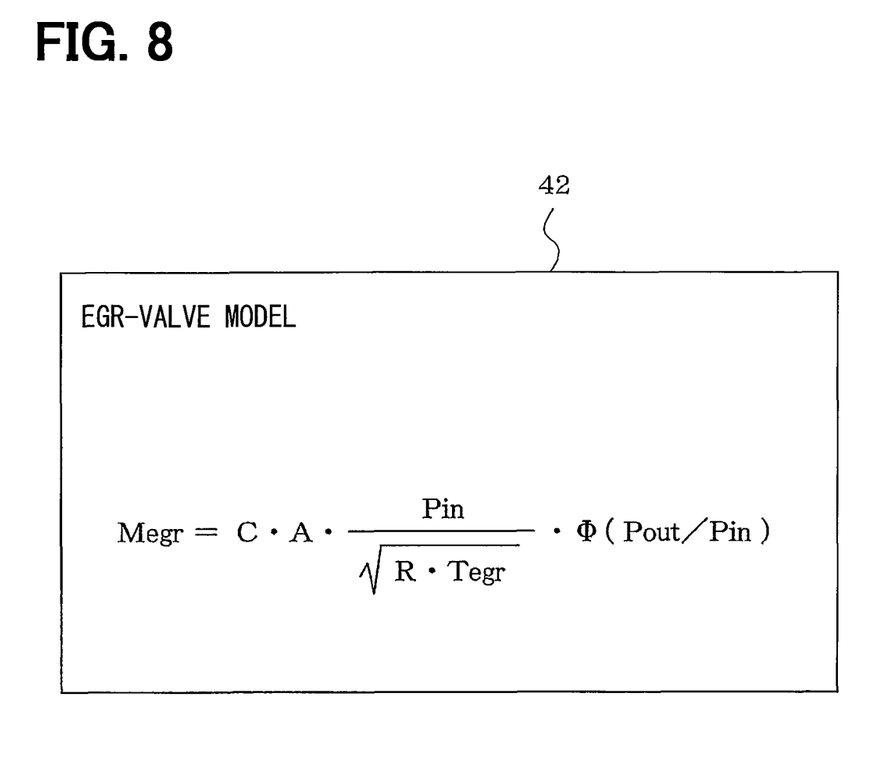
FIG. 8 is a chart for explaining an EGR valve model according to a third embodiment.

Referring to FIG. 8, a third embodiment will be described hereinafter. In the third embodiment, the same parts and components as those in the first embodiment are indicated with the same reference numerals and the same descriptions will not be reiterated.

As shown in FIG. 8, the EGR valve model 42 is defined by a physical formula which defines a relationship between an opening degree of the EGR valve 31, an upstream pressure "Pin" of the EGR valve 31, a downstream pressure "Pout" of the EGR valve 31, and an EGR gas quantity "Megr" passing through the EGR valve 31.

Specifically, the EGR valve model 42 is approximated by a formula (3):

$$Megr = C \cdot A \cdot \frac{Pin}{\sqrt{R \cdot Tegr}} \cdot \Phi(Pout/Pin) \quad (3)$$

wherein "C" is a flow rate coefficient, and "A" is an opening sectional area of EGR piping 29, "R" is a gas constant, "Tegr" is a temperature of the EGR gas upstream of EGR valve 31, and $\phi(Pout/Pin)$ is a function of (Pout/Pin).

According to the third embodiment, "Megr" is computed based on the opening degree of the EGR valve 31, the pressure "Pin" and "Pout", and the EGR gas temperature "Tegr" according to the above formula (3). Thus, "Megr" can be computed with high accuracy.

According to the third embodiment, substantially the same advantage can be achieved as the first embodiment.

In a case that a flow delay of the EGR gas passing through the intake port is neglectable, the intake-port-delay model 47 is not always necessary.

The present disclosure can be applied to an engine provided with a mechanical supercharger or an electrical supercharger.

Furthermore, the above supercharger is not always necessary as long as the engine is provided with an EGR apparatus.

What is claimed is:

1. An apparatus for estimating exhaust gas recirculation quantity of an internal combustion engine provided with an EGR valve which adjusts a quantity of an exhaust gas recirculating from an exhaust passage to an intake passage upstream of an throttle valve through an EGR passage, the apparatus comprising:

a computing portion for computing a quantity of the exhaust gas passing through the EGR valve by means of an EGR valve model which simulates a behavior of a recirculated exhaust gas passing through the EGR valve in the EGR passage;

a computing portion for computing a quantity of the exhaust gas flowing into a cylinder based on the quantity of the exhaust gas passing through the EGR valve, by means of an EGR-gas-delay model which simulates a behavior of the exhaust gas passing through the EGR valve and the throttle valve and flows into a cylinder;

a total gas-quantity computing portion for computing a total quantity of passing through the throttle valve by means of an throttle model which simulates a behavior of a gas passing through the throttle valve in the intake passage;

an intake air flow rate obtaining portion for detecting or estimating a fresh air quantity flowing through the intake passage; and a correction portion for correcting a computed total-gas-quantity passing through the throttle valve based on the fresh air quantity detected or estimated by the intake air flow rate obtaining portion; wherein the EGR valve model is defined by a map which defines a relationship between an opening degree of the EGR valve, the total gas quantity passing through the throttle valve and the exhaust gas quantity passing through the EGR valve.

2. An apparatus for estimating exhaust gas recirculation quantity of an internal combustion engine according to claim 1, wherein
the EGR-gas-delay model includes:
a confluent-delay model which simulates a behavior of EGR gas passing thorough the EGR valve and flowing into the intake passage upstream of the throttle valve;
an intake-pipe-delay model which simulates a behavior of EGR gas flowing in the intake passage upstream of the throttle valve and then passing through the throttle valve; and
an intake-manifold-delay model which simulates a behavior of EGR gas passing through the throttle valve and then charged into the intake passage downstream of the throttle valve.

3. An apparatus for estimating exhaust gas recirculation quantity of an internal combustion engine according to claim 1, wherein
the intake-pipe-delay model is defined by a matrix which discretizes a behavior of EGR gas flowing in the intake passage upstream of the throttle valve and then passing through the throttle valve.

4. An apparatus for estimating exhaust gas recirculation quantity of an internal combustion engine provided with an EGR valve which adjusts a quantity of an exhaust gas recirculating from an exhaust passage to an intake passage upstream of an throttle valve through an EGR passage, the apparatus comprising:
a computer system, including a computer processor, the computer system being at least configured to:
compute a quantity of the exhaust gas passing through the EGR valve using an EGR valve model which simulates a behavior of a recirculated exhaust gas passing through the EGR valve in the EGR passage;
compute a quantity of the exhaust gas flowing into a cylinder based on the quantity of the exhaust gas passing through the EGR valve, using an EGR-gas-delay model which simulates a behavior of the exhaust gas passing through the EGR valve and the throttle valve and flows into a cylinder;
compute a total quantity of gas passing through the throttle valve by means of an throttle model which simulates a behavior of a gas passing through the throttle valve in the intake passage;
detect or estimate a fresh air quantity flowing through the intake passage; and
correct a computed total-gas-quantity passing through the throttle valve based on the detected or estimated fresh air quantity; wherein
the EGR valve model is defined by a map which defines a relationship between an opening degree of the EGR valve, the total gas quantity passing through the throttle valve and the exhaust gas quantity passing through the EGR valve.

5. An apparatus for estimating exhaust gas recirculation quantity of an internal combustion engine according to claim 4, wherein
the EGR-gas-delay model includes:
a confluent-delay model which simulates a behavior of EGR gas passing thorough the EGR valve and flowing into the intake passage upstream of the throttle valve;
an intake-pipe-delay model which simulates a behavior of EGR gas flowing in the intake passage upstream of the throttle valve and then passing through the throttle valve; and
an intake-manifold-delay model which simulates a behavior of EGR gas passing through the throttle valve and then charged into the intake passage downstream of the throttle valve.

6. An apparatus for estimating exhaust gas recirculation quantity of an internal combustion engine according to claim 4, wherein
the intake-pipe-delay model is defined by a matrix which discretizes a behavior of EGR gas flowing in the intake passage upstream of the throttle valve and then passing through the throttle valve.

* * * * *